Jan. 31, 1967    R. D. CHISHOLM    3,301,999
SAFETY CONTROL MECHANISM FOR HIGH TEMPERATURE OVEN
Filed Aug. 28, 1963    3 Sheets-Sheet 1

INVENTOR.
ROY D. CHISHOLM
BY Richard L. Caslin
HIS ATTORNEY

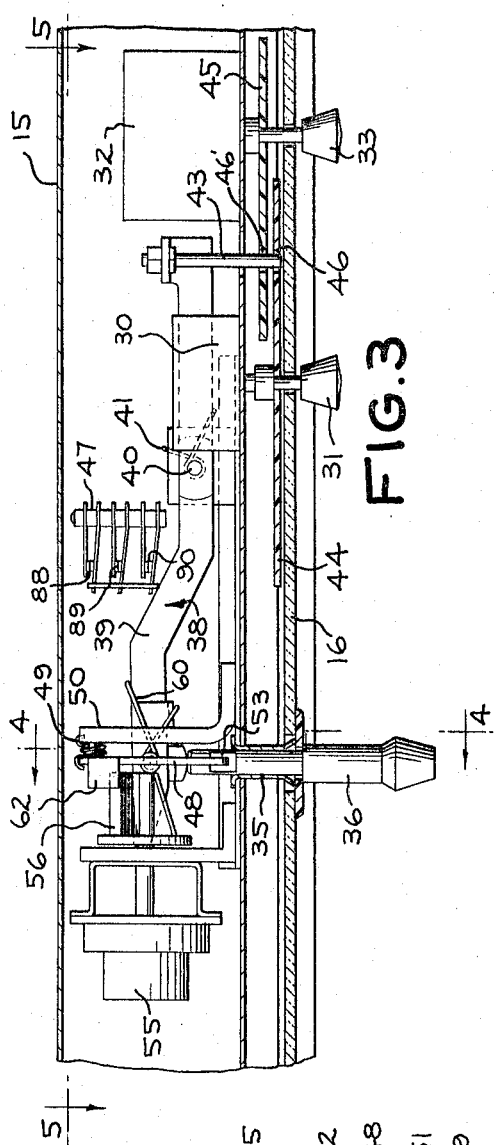

Jan. 31, 1967 R. D. CHISHOLM 3,301,999
SAFETY CONTROL MECHANISM FOR HIGH TEMPERATURE OVEN
Filed Aug. 28, 1963 3 Sheets-Sheet 3
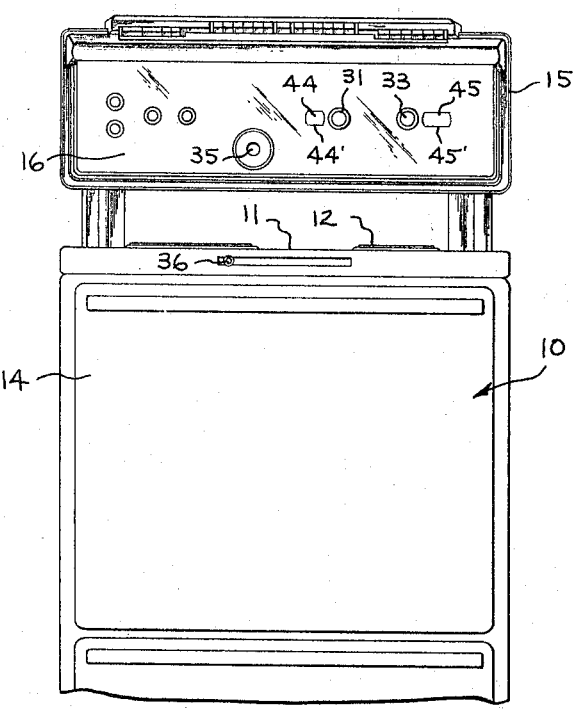
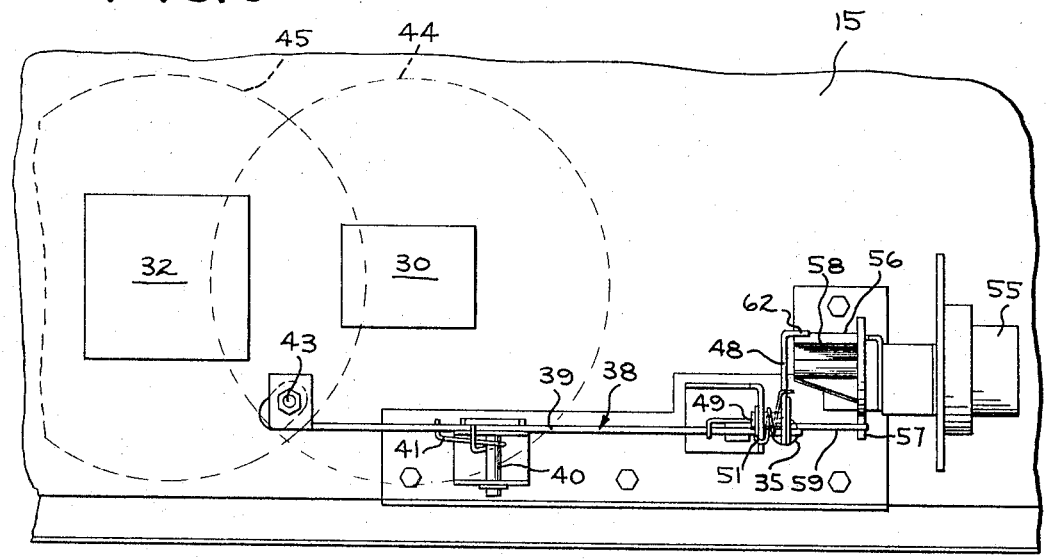
INVENTOR.
ROY D. CHISHOLM
BY Richard L. Caslin
HIS ATTORNEY

United States Patent Office 3,301,999
Patented Jan. 31, 1967

3,301,999
SAFETY CONTROL MECHANISM FOR HIGH TEMPERATURE OVEN
Roy D. Chisholm, Louisville, Ky., assignor to General Electric Company, a corporation of New York
Filed Aug. 28, 1963, Ser. No. 305,053
6 Claims. (Cl. 219—393)

The present invention relates to an oven design and particularly to a mechanical door interlock system for ultimately controlling the heating means of a high temperature domestic oven. This system along with the control circuitry that is associated therewith will insure that the temperature within the oven cavity may not be raised above normal cooking temperatures unless the oven door is first closed and latched. Moreover, the invention will not allow the oven door to be opened when the oven temperature is above the normal cooking temperature range.

This invention was developed for use with a high temperature oven that is useable in the home to free the housewife of the laborious task of scrubbing the food soil from the walls of the oven cavity. High temperature is used in an automatic heat cleaning cycle of about one to three hours duration so as to burn off all food soil from the oven walls and leave the walls perfectly clean as a new oven. Normal cooking temperatures vary between 150° F. and 550° F., while this heat cleaning temperature range varies between 750° F. and 950° F.

During normal cooking operations food particles and grease spatterings often drop onto the hot oven surfaces where they are partially burned and discolored and adhere tenaciously to the walls. Strong cleaning agents are available on the market for application to the oven walls. Most, if not all of these cleaning agents, however, are toxic and harmful to the skin and would be hazardous if spilled into a person's eyes. All of these disadvantages are coupled with the requirement that a strong rubbing action must be used in order to dislodge the soil. The copending application of Bohdan Hurko, Serial No. 244,493, filed December 13, 1962, and assigned to the General Electric Company the assignee of the present invention, now Patent No. 3,121,158, teaches of the novel oven design and method of providing a self-cleaning oven.

In the high temperature ovens of the class described where the maximum temperature might reach as high as 950° F. it is imperative to latch the oven door before the cleaning cycle is initiated as well as to prevent the oven door from being unlatched until the oven air temperature returns to within the normal cooking temperature range. Once the high temperature cycle is set in motion the lock means becomes effective to insure that the oven door may not be opened until the heat cleaning cycle has run its course.

The principal object of the present invention is to provide an oven with suitable mechanical interlocking means using a removable door handle to insure that the oven door is first locked before the temperature within the oven cavity may be caused to rise above normal cooking temperatures and to insure that the oven door may not be unlocked while the temperature remains in the high temperature range.

A further object of the present invention is to provide a mechanical interlock system for a domestic oven of the class described with the use of a special key member that is insertable into the control panel for cooperation with an interlocking and indexing means that insures that the manual control devices are properly set before the high temperature cycle can be initiated.

A further object of the present invention is to form a relationship between the handle of the door latching means and the key member to insure that the door latching mechanism will hold the oven door in a closed position during the heat cleaning cycle.

A still further object of the present invention is to provide an oven design with an oven door latching mechanism where the handle is removable when the door is latched and the handle serves as a key member for operating an interlocking mechanism and insures that the oven controls are properly set before a high temperature heat cleaning cycle is initiated.

The present invention, in accordance with one form thereof, is embodied in an oven design formed by an oven liner and an access door. A manual latching means is provided for holding the door in a closed position. Suitable heating means, either electric or gas, are provided for raising the temperature of the oven cavity to normal cooking temperatures between about 150° F. and 550° F. Heating means are also provided for raising the temperature above the normal cooking temperatures to a maximum of between about 750° and 950° F. to render the oven self-cleaning by burning off the food soil. The oven includes both a manual selector switch means for governing the energization of the heating means as well as a manually adjustable thermostatic device for maintaining the oven temperature between the desired limits. A control panel is used for supporting the selector means and the thermostatic device as is conventional in this art.

The door latching mechanism is so designed that it has a handle that may be removed when and only when the door is closed and latched. This removable handle serves as a key member that is insertable into a key slot in the control panel. An interlocking member is associated with the control panel for cooperation with an indexing means for at least one of the selector means and thermostatic device. The insertion of the key member into the control panel causes the interlocking means to move into the indexing means. Conversely, the failure of the interlocking means to enter the indexing means prevents the key member from being inserted into the control panel. Switch means cooperate with the interlocking means for activating the heating means upon the full insertion of the key member. A sequence timer is associated with the interlocking means and it is started by the full movement of said interlocking means. The timer includes control means for activating and de-activating the heating means and the timer at predetermined times.

My invention will be better understood from the following description taken in conjunction with the accompanying drawings and its scope will be pointed out in the appended claims.

FIGURE 2 is a fragmentary plan view in cross-section of the backsplash of the range showing the relative positions of the sequence timer, the key slot in the control panel, the interlock means, the manual selector switch and the oven thermostat;

FIGURE 3 is a view similar to that of FIGURE 2 after the removable handle of the oven door latching mechanism has been inserted as a key member into the control panel of the backsplash for moving the interlock means for mating engagement with the indexing means of the selector switch and thermostat thereby starting the sequence timer on its heat cleaning cycle;

FIGURE 4 is a fragmentary cross-sectional elevational view through the backsplash taken on the line 4—4 of FIGURE 3 and showing the key member positioned in the control panel and the lock member at a time shortly after it has been disengaged from the notch in the key where it had prevented the withdrawal of the key during the heat cleaning cycle;

FIGURE 5 is a rear elevational view of the control panel in the backsplash taken on the line 5—5 of FIGURE 3;

FIGURE 7 is a front elevational view of the range of FIGURE 1 showing the nature of the backsplash and control panel.

Figure 1:
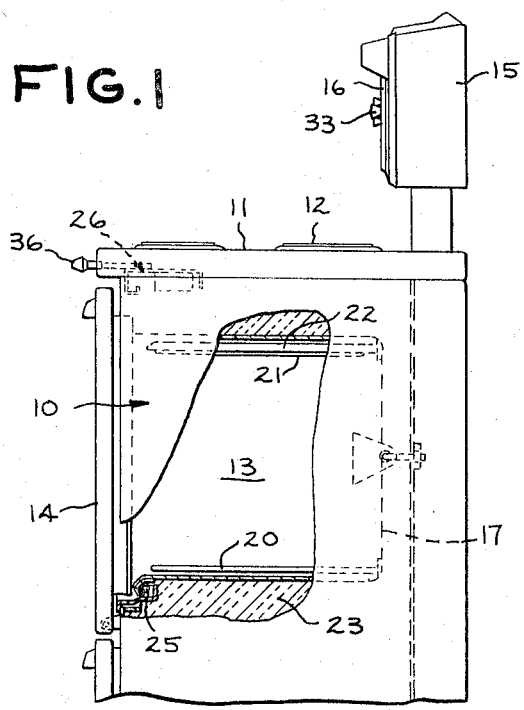
FIGURE 1 is a right side elevational view of a free-standing range having the oven control system embodying the present invention with parts of the range body broken away to show the oven cavity.

Turning now to a consideration of the drawings and in particular to FIGURE 1 there is shown for illustrative purposes a free-standing electric range 10 having a top cooking surface 11 with a plurality of surface heating elements 12, an oven cavity 13, a front-opening drop door 14 for the oven, and a backsplash 15 arranged along the back edge of the cooking surface 11 and containing a control panel 16 in the front face thereof which includes a plurality of manual control devices which govern the energization of the various heating elements of the range. The oven cavity 13 is formed by a metallic oven liner 17 of box-like construction that has an open front that is adapted to be closed by the door 14 mentioned previously.

As in standard electric ovens there is a lower heating element or Bake unit 20, and an upper heating element or Broil unit 21. Combined with the Broil unit is a metal reflector 22 that overlies the Broil unit and allows the majority of the heat energy developed by the unit to be directed down toward the food placed under it with a searchlight pattern of heat. Both the Bake and Broil units 20 and 21 are provided with terminals that extend out through the back wall of the oven liner for connection with power lead wires (not shown) or the terminals may be mounted in a pivoted support plate fastened to the back wall as is standard in this art. The oven liner 17 is insulated from the range body by having a relatively thick blanket of insulation 23 of fiberglass or the like material surrounding the liner in order to prevent the waste of heat energy from the oven cavity as well as to maintain the temperature of the outer walls of the range at a temperature which will not permit adjacent kitchen cabinet structures to become heated above a maximum of 194° F. which is a requirement of the Underwriters' Laboratory, Inc.

It is imperative to provide generally uniform wall temperatures within the oven cavity in order to insure complete cleaning of the food soil so that no hand work is necessary in order to obtain thorough cleanability. Some heat energy will escape through and around the oven door 14 and it has been found expedient to add an auxiliary or mullion heater 25 which is wrapped around the outside of the throat of the open front of the oven liner as is best seen in FIGURE 1 to replenish the heat loss in this vicinity and thereby obtain relatively uniform wall temperatures throughout the oven.

A door latch mechanism 26 is located within the range body above the oven door 14 and beneath the cooktop 11. The present invention is not directed toward a specific door latching mechanism, but instead is concerned with an oven heating control system which is activated by a removable handle of the door latching system to insure that the high temperature heat cleaning cycle may not be initiated until the oven door 14 is closed and latched, as well as to insure that the door may not be opened at any time while the oven temperature is within the heat cleaning temperature range. If more information is desired about the door latching mechanism per se, reference may be made to the present applicant's copending application Serial No. 305,067, now Patent No. 3,176,485 entitled "Tamper-Proof Door Latching Mechanism" which was filed concurrently herewith, and is assigned to the General Electric Company, the assignee of the present invention.

Turning now to the showing of the interior of the backsplash of FIGURE 2, the control panel 16 of the backsplash 15 is shown as supporting a manual selector switch 30 having a control knob 31 and a manually selectable thermostat 32 having a control knob 33. Also located in the control panel 16 is a key slot 35 for receiving a special key member 36 shown in FIGURE 3. This key member normally serves as the handle for the door latching mechanism 26 and it is so designed that it can be removed from the latching mechanism only when the oven door 14 is closed and latched by the mechanism. The specific door latching mechanism does not form part of the present invention but it is being disclosed and claimed in a copending application of the present applicant as was mentioned in the preceding paragraph.

Located within the backsplash is an interlock means 38 comprising an elongated link member 39 that is pivoted adjacent its center as at 40 to move in a horizontal plane. A spring biasing force is exerted by spring member 41 which normally moves the link 39 in a counterclockwise direction as shown in FIGURE 2. One end of the link 39 extends across the back of the key slot 35 while the opposite end is provided with a feeler 43 in the form of a locating pin which is capable of determining whether the switch 30 and thermostat 32 are properly set for the high temperature heat cleaning cycle. Both the switch and thermostat are provided with an indicator dial 44 and 45 respectively each cooperating with a small viewing window 44′ and 45′ respectively. These dials are of rather large diameter so that they overlap each other along one side thereof. Each dial 44 and 45 is provided with an indexing opening 46 and 46′ respectively so that when the switch and thermostat are properly set to the high temperature heating cycle these openings are aligned and the feeler 43 is able to extend into the indexing means once the key member 36 is inserted in the key slot 35 as is best seen in FIGURE 3. While the drawing illustrates a modification where both the switch and thermostat are provided with an indexing opening it should be understood that this invention would also be useful if only one of the switch and thermostat devices were so provided. Moreover, the dials need not be overlapped but may be spaced away from each other if two feelers 43 are used. Another modification would be to substitute a notched collar on the switch and/or thermostat shaft for each dial and its indexing opening.

The pivotal movement of the interlock means 38 by the insertion of the key member 36 serves to engage a switch member 47 and close the contact switches thereof which initiate the heating circuit for the cleaning cycle as will be better explained hereinafter. It is also well to be able to retain the key member 36 within the key slot during the heating cleaning cycle so that the door latch may not be opened and the setting of the switch 30 or thermostat 32 cannot be tampered with. This is provided by a lock member 48 that is located in line with the key slot 35 as is best seen in FIGURE 2 and is pivotally supported as at 49 from a bracket member 50 to move in a vertical plane. Spring means 51 is associated with the pivot pin means 49 to normally bias the lock member 48 in a counterclockwise direction as is seen in FIGURE 4. The distal end of the lock member is formed with a hook formation 52 for engagement with a notch 53 in the key member for obtaining a good grip action between the two members. Locating the pivot 49 in the same horizontal plane as or below the notch 53 assures that pulling the key 36 will not cause the hook 52 to lose its grip. The timing of the cleaning operation is provided by an electric motor-driven sequence timer 55 that drives a double cam member 56. As is best seen in FIGURE 4, the cam member 56 has a pair of cam surfaces 57 and 58. The first cam surface 57 cooperates with the interlock means 38, while the second cam surface 58 cooperates with the lock member 48. Looking at FIGURE 4 the cam surface 57 has arrived at the end of one complete cycle where it strikes a pivoted pawl 59 that is positioned on the adjacent end of the link member 39 so as to be able to swing in a clockwise direction as seen in plan view. This pawl becomes rigid when a force is exerted on it to swing in a counterclockwise direction because of a tab 61 that extends down from the pawl along one side edge of the link member 39. A spring means 60 cooperates with the pawl 59 to hold the pawl in a normal position as shown in FIGURE 2.

When the key member 36 is inserted into the key slot 35, the link member 39 is pivoted to the position shown in FIGURE 3 and during this movement of the link member the pawl 59 pushes the cam surface 57 in front of it thereby starting the sequence timer 55 to turn which causes the cam member 56 to begin its slow moving single revolution or cycle in a counterclockwise direction as is seen in FIGURE 4.

The cam surface 58 is adapted to cooperate with the underside of a ledge portion 62 formed along one side of the lock member 48 to hold the hook portion 52 of the lock member 48 out of engagement with the slot 53 of the key member 36. As the cam member 56 is turned in a counterclockwise direction by the pivotal action of the link member 39, the cam surface 58 will move out from under the ledge 62 thereby allowing the hook portion 52 of the lock member 48 to be biased by spring 51 into a lowered position in locking engagement with the slot 53 of the key member 36.

Figure 6:
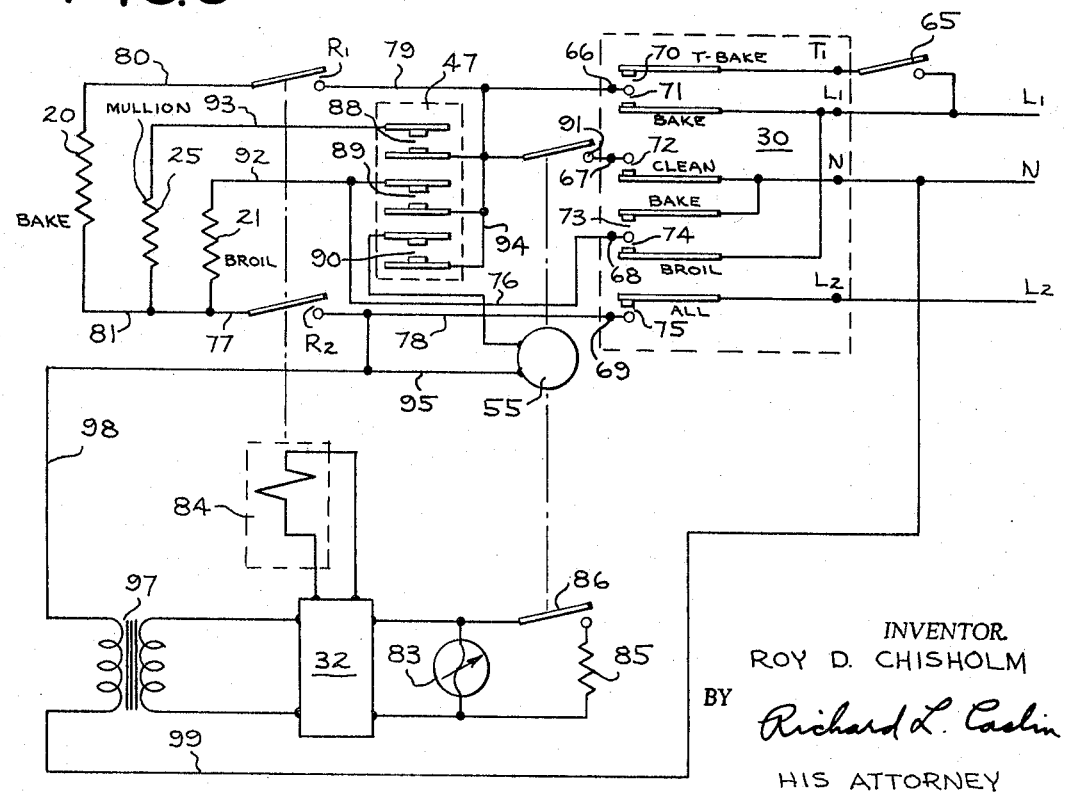
FIGURE 6 is a partial circuit diagram of the heating and control circuits for the high temperature oven of the present invention.

As shown in FIGURE 6, the sequence timer 55 has in addition to the double cam member 56, a pair of normally open switches 86 and 91 which are closed when the timer is started and are opened at or near the termination of the cleaning cycle as is fully explained hereinafter with relation to the circuit diagram. The first switch 86 is in the low voltage control circuit and the second switch 91 is in the power circuit that supplies the heating elements 21 and 25. The closing of the first switch 86 shunts a biasing resistor 85 across the resistance of a temperature sensor 83 to shift the temperature scale from the normal cooking range between about 150° F. and 550° F. to the heat cleaning range somewhere between 750° F. to 950° F. The closing of the second switch 91 completes the power circuit to the heating elements 21 and 25.

Attention will now be directed to the schematic circuit diagram of FIGURE 6 which is useable with the oven of the present invention. There is for example a three-wire Edison source of power of 236 volts, single phase, 60 cycle, A.C. which is usually available in the average residence. This power source has a pair of line wires L1 and L2 and a grounded neutral conductor N. This circuit network also includes the manually operable selector switch 30, the manually settable temperature control device or thermostat 32 and the oven heating elements that were illustrated in FIGURE 1; namely, the Bake unit 20, the Broil unit 21, and the Mullion heater 25. Other elements in the circuit include the sequence timer 55 with its independently operated contacts 86 and 91, and the interlock switch 47 which is acted upon by the movement of the link member 39 as was mentioned previously. The remaining elements in the circuit will be discussed in detail during an explanation of the circuit operation.

The oven selector switch 30 is interposed between the source of power supply and the heating elements for controlling the energization thereof. The selector switch has line terminals L1, L2, N as well as an additional terminal T1. This terminal T1 is for use with a conventional oven timer that is illustrated simply as switch 65 and is not to be confused with the sequence timer 55 which controls only the length of the heat cleaning cycle. The selector switch 30 also has a plurality of load terminals 66–69, as well as six sets of switch contacts 70–75.

These switch contacts are each labeled with the operation which takes place when the particular switch contacts are closed. For example, during a Broiling operation the switch contacts 74 and 75 are closed, since contacts 75 are common contacts to all energizing circuits. During this Broiling operation only the Broil unit 21 is energized and it is operated at 236 volts across lines L1 and L2. This is accomplished by an internal connection in the switch 30 between line terminal L1, switch contacts 74 and load terminal 68. Then the circuit may be traced through leads 76 and 92, Broil unit 21, lead 77, through relay contacts R2, lead 78 to load terminal 69 of the selector switch and through common switch contacts 75 to line terminal L2.

During a Baking operation switch contacts 71, 73 and 75 are closed and the Bake unit 20 is energized at 236 volts, while the Broil unit 21 is at a lower voltage of 118 volts. These circuit arrangements can be traced from line L1 to line terminal L1, through switch contacts 71, lead 79 through relay contacts R1, lead 80 and Bake unit 20, line 81 and line 77 through relay contacts R2 and lead 78 to load terminal 69, through switch contacts 75, to line terminal L2. Simultaneously, there is a second circuit through the Broil unit 21 which may be traced from line L2, line terminal L2, switch contacts 75, lead 78 through relay contacts R2 and lead 77, Broil unit 21, leads 92 and 76 to load terminal 68, through switch contacts 73 to neutral terminal N to the neutral conductor N.

During a Time Baking operation only the Bake unit 20 is energized and it operates at the higher voltage of 236 volts across lines L1 and L2. This Time Baking circuit is from line L1 through timer switch 65 to line Terminal T1 through switch contacts 70 to load terminal 66, lead 79, through relay contacts R1, lead 80, Bake unit 20 leads 81 and 77, through relay contacts R2, lead 78 to load terminal 69, through switch contacts 75 to line terminal L2 and line L2.

The temperature control device or thermostat 32 is of the basic type that is disclosed in the Baker Patent No. 2,962,575. The control circuit for the electric thermostat 32 is a low voltage circuit of about 12 volts that is energized from the secondary of a step-down transformer 97. The primary of this transformer is at 118 volts across L2 and N by means of leads 98 and 99 to the power supply leads through the oven selector switch 30. During normal cooking operations the circuit to line L2 is from lead 98 to lead 78, to load terminal 69, through switch contacts 75 to line terminal L2 and thus to line L2. The other lead 99 of the transformer is connected directly to grounded conductor N. This thermostat 32 has a pulsing thermal relay or voltage regulator (not shown) that is controlled by a variable-resistance senser 83 that in turn controls a responder relay (not shown) which finally controls an output relay 84 that includes the two relay contact switches R1 and R2 that were mentioned previously as controlling the power to the heating elements 20, 21 and 25 of the oven. The senser 83 is preferably a resistor having a high temperature coefficient of resistance and it is located within the oven cavity to detect the oven air temperature. This senser may be constructed of fine wire such as platinum having a high positive temperature coefficient of resistance, or as an alternative a ceramic thermistor element may be used having a high negative temperature coefficient of resistance. It is to be understood however that the use of a negative coefficient material reverses the action of the thermostat. For purposes of the description of the present invention, the senser 83 has a high positive temperature coefficient of resistance.

This type of electric thermostat has been perfected by Baker and others so that it is accurate for a range of normal cooking temperatures between about 150° F. and 550° F. It would result in a very expensive design to retain its accuracy of operation while extending the principles of this Baker design to include a temperature in the range between about 750° F. and 950° F. Thus, provision has been made for shifting the control point of the electric thermostat so that there are in effect two accurate temperature ranges, one covering the normal cooking temperatures and the second covering the heat cleaning temperatures. The preferred manner in which this shift of the control point of the circuit can be effected is by reducing the effective resistance of the sensor by placing a shunt resistor 85 across the sensor by use of a switch 86 that is controlled by the sequence timer 55 once the key member 36 is inserted into the backsplash and the interlock means 38 including the link member 39 is shifted. Thus, in order to shift the control point of the thermostat 32 into the heat cleaning high temperature range the oven selector switch 30 must be properly set to the heat cleaning position thereby closing its switch contacts 72 and 75. Also, the oven thermostat 32 must be set properly to the position where the high temperature range will be initiated when the sequence timer 55 closes its switch contacts 86 and 91. This again is not possible until the door interlock switch 47 has been closed thereby closing the circuit through its three contact switches 88–90. The output relay contacts R1 and R2 are pulsating contacts that are closed when heat is demanded from the heating elements or source of heat. They are opened only when the oven temperature reaches the maximum temperature predetermined by the thermostat setting thereby causing the relay contacts R1 and R2 to cycle on and off and thereby hold the oven temperature at a substantially constant value until the sequence timer 55 has completed the heating cycle of about 150 minutes and caused its switch contacts 86 to open and thereby de-energize the heat cleaning cycle. The sequence timer 55 continues to run another approximate 30 minutes while the oven cools to within the normal cooking temperature range. Then it opens contacts 91 which stop the timer. Moreover, it releases the key just before shutting off.

A modification of this control circuit would be to eliminate the control of the contacts 86 by the timer 55 and have these contacts 86 replaced by contacts 90 of the interlock switch member 47 and shunted across the timer contacts 91, to load terminal 67, through selector switch contacts 72 to neutral terminal N. Hence, when the selector switch 30 and thermostat 32 are properly set to the Heat Clean position, and the oven door is latched, and the key member 36 is inserted into the backsplash of the range, the interlock means will be motivated to close the interlock switch contacts 88–90. The closing of the switch contacts 90 would in that example energize the timer 55 and connect the biasing resistor 85 across the temperature senser 83 to enter the high temperature range. Then, when the cleaning cycle has been completed, the timer 55 would open the timer contacts 91 and de-energize the heating elements to initiate the cool-down period, and finally after a predetermined time would release the lock member 48 so that the key may be replaced in the door latching mechanism for unlocking the oven door.

Turning back to the power circuit, mention will now be made of the circuit for the Heat Cleaning operation. During this high temperature cycle all three heating elements Bake unit 20, Broil unit 21 and Mullion heater 25 are energized across line L2 and neutral conductor N at a relatively low voltage of 118 volts. As mentioned previously, the interlock switch 47 is closed when the heat cleaning cycle is to be operated. This switch 47 includes three sets of switch contacts 88–90. The circuit for the Broil unit 21 is from neutral wire N through line terminal N, through switch contacts 72, through sequence timer switch contacts 91 which energize the sequence timer 55 through the interlock switch contacts 90 by means of lead 94 and thus to neutral conductor N, while the opposite side of the circuit is from the sequence timer 55 through lead 95 and lead 78 to the load terminal 69, through switch contacts 75 to line terminal L2 and thus line L2. The circuit continues through the door interlock switch 47 by means of switch contacts 89 and lead 92, Broil unit 21, lead 77, through relay contacts R2, lead 78, through load terminal 69 and switch contact 75 to line terminal L2 and line L2.

The Mullion heater is also energized during the heat cleaning cycle in much the same manner from switch contact 72 of the oven selector switch 30, through the timer switch contacts 91 to the interlock switch contacts 88 to the Mullion heater 25, then through lead 77, relay contacts R2, lead 78 to load terminal 69, through switch contacts 75 to line terminal L2.

The Bake unit 20 is likewise energized at about 118 volts across line L2 and neutral wire N from the timer contacts 91, lead 79, relay contacts R1, lead 80, Bake unit 20, leads 81 and 77, relay contacts R2, and lead 78 to load terminal 69 and switch contacts 75 to line terminal L2. The biasing resistor 85 would only be taken out of the control circuit when the key is removed from the key slot thereby releasing the interlock means and opening the switch contacts 88–90. Another modification would be to remove the timer switch 90 from the interlock switch 47 and incorporate it into either the selector switch 30 or the thermostat 32.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A domestic cooking oven comprising an oven body supporting a box-like oven liner and an access door to define an oven cavity, a source of electric power supply, and a heating circuit adapted to be completed to said power source to supply heat into said cavity, and a manual door latching means for holding the door in a closed position; the combination comprising a selector switch having an Off position and an On position, said selector switch in its Off position interrupting said heating circuit, said selector switch in its On position preparing said heating circuit, a control circuit having a manually settable temperature control device having a variable Bake position and a Clean position, said temperature control device in its variable Bake position correspondingly presetting a variable Bake temperature for said oven cavity in the normal cooking temperature range extending from about 150° to about 550° F., said temperature control device in its Clean position presetting a given heat-cleaning temperature for said oven cavity in the Heat-Clean temperature range extending from about 750° to 950° F., the door latching means having a removable handle, a key slot formed in the body of the oven adjacent the location of the selector switch and the temperature control device, the removable handle constituting a key member that is insertable into the key slot, and an interlock means operatively associated with the key member and at least one of the selector switch and the temperature control device, and an index means included with at least one of the selector switch and temperature control device to receive the interlock means only when Clean position has been set to align the index means with the interlock means, and switch means operated by the movement of the interlock means into the index means for energizing the heating circuit into a Heat-Clean cycle thereby insuring that the cleaning cycle cannot be initiated until the door is latched shut and at least one of the selector switch and temperature control device are positioned at the Clean setting, a lock member for engaging the key member after the cycle has been initiated thereby preventing the oven door from being unlocked during the Heat-Cleaning cycle, a sequence timer for timing the cycle, the timer having a start camming means that is positioned to be operated by the movement of the interlock means, the timer including a lock camming means for controlling the position of the lock member and for disengaging the lock member from the key member at the end of the cycle, and timer switch means located in the heating circuit for de-energizing the heating circuit at a given time prior to the end of the cycle so as to cool down the oven before the oven door may be opened, and for stopping the timer after the key is released at the end of the cycle.

2. A domestic cooking oven comprising a box-like oven liner and an access door that defines an oven cavity, a source of electric power supply, and a heating circuit adapted to be completed to said power source to supply heat into said cavity, a manual door latching means for holding the door in a closed position; the combination comprising a control panel for the oven and including an oven selector switch and oven thermostat arranged adjacent each other for controlling the heating circuit in a normal cooking temperature range between 150° and 550° F. and also being capable of raising the oven temperature into a high temperature range between 750° and 950° F. to remove the food soil automatically, a key slot formed in the control panel, the door latching means having a removable handle constituting a key member that is insertable into the key slot, and an interlock means engageable by the inserted key member and operatively connected to at least one of the switch and thermostat, an indexing means provided for at least one of the switch and thermostat to receive the interlock means only when at least one of the switch and thermostat are set to obtain the high temperature range and the key is inserted into the control panel.

3. A domestic cooking oven comprising an insulated body member supporting a box-like oven liner and an access door that defines an oven cavity, electric heating elements in heat transfer relation with the oven cavity, a source of voltage and a power circuit including the heating elements for connection thereto, a control panel mounted on the oven body, a circuit selector switch and an oven thermostat mounted with the control panel, the thermostat being confined in a low voltage control circuit and having a temperature sensor positioned within the oven cavity, the thermostat including contact means for governing the energization of the heating elements, both the selector switch and the thermostat including an indicator dial which overlap each other and contain an indexing opening for aligning one opening with another for a particular setting of the switch and thermostat, a key slot formed in the control panel and a key member for insertion therein, an interlock means operatively associated with the control panel and being acted upon by the insertion of the key member to cause the interlock means to enter the indexing means of the switch and thermostat, the failure of the interlock means to enter the indexing opening preventing the key member from entering the key slot, and switch means operated by the interlock means once the key is inserted into the key slot by energizing the heating element to obtain a high temperature above normal cooking temperatures, and a sequence timer positioned to be started by the movement of the interlock means for timing a predetermined high temperature cycle.

4. An electric oven for domestic use comprising an insulated cabinet provided with both a box-like oven liner and an access door that defines an oven cavity, electric heating elements and heat transfer relation with the oven cavity, a source of electric power, and a power circuit including the heating elements for connection to the power source, a control panel mounted on the oven cabinet, a power level selector switch and an oven thermostat combined with the control panel, the selector switch being connected in the power circuit, a low voltage control circuit including the oven thermostat, a temperature sensor positioned in the oven cavity and cooperating with the thermostat, and contact means provided with the thermostat and combined in the power circuit for maintaining the temperature level within the oven; the invention comprising a key slot formed in the control panel and a key member for insertion therein, at least one of the selector switch and thermostat devices including an indexing means that is related to a particular setting of a device, and interlock means operatively associated with the control panel and being acted upon by the insertion of the key member to cause the interlock means to enter the said indexing means, the failure of the interlock means to enter the indexing means serving to prevent the key member from entering the key slot, and switch means operated by the movement of the interlock means once the key is inserted into the key slot for energizing both the control and power circuits, and switch contact means closed upon the initiation of the Heat-Cleaning cycle for energizing the sequence timer and contact means controlled by the timer for de-energizing the power circuit after a predetermined time, to initiate a cool-down period, and lock means cooperating with the key member and the timer so that the time, to initiate a cool-down period, and lock means coop- and prevent its removal when the Heat-Cleaning cycle is initiated and to release the key member after the cool-down period, and before the timer is inactivated.

5. A baking oven having an oven cavity formed by an oven liner and an access door, heating means provided with a source of energy for the oven cavity, manual selector means for governing the amount of energy converted by the heating means, an electrical control circuit comprising a low voltage source of current including a temperature sensor and a manually adjustable thermostatic device, a control panel supporting the selector means and a thermostatic device; the invention comprising a manual door latching means for holding the door in a closed position, a key slot formed in the control panel, the door latching means including a removable handle which forms a key member for insertion in the said key slot, at least one of the selector means and the thermostatic device including an indexing means that is related to a particular setting of the device, and interlock means operatively associated with the control panel and being acted upon by the insertion of the key member into the slot to cause the interlock means to move and enter the said indexing means, switch means operated by the movement of the interlock means for activating the heating means, a sequence timer cooperating with the interlock switch means for governing the time of operation of the heating means to be started by the movement of the interlock means, the timer including means for de-activating the heating means after a predetermined time.

6. A baking oven having an oven cavity formed by an oven liner and an access door, heating means provided with a source of energy for the oven cavity, manual selector means for governing the amount of energy converted by the heating means, an electrical control circuit comprising a low voltage source of current and including a temperature sensor and a manually adjustable thermostatic device, a control panel supporting the selector means and the thermostatic device; the invention comprising a high temperature heat cleaning system having a temperature range above the normal cooking temperature range of between 150° and 550° F. to a maximum temperature between 750° and 950° F. the system including a door latching mechanism for holding the door in a closed position, a key slot formed in the control panel, the door latching mechanism including a removable handle serving as a key member for insertion into the said key slot, at least one of the selector means and the thermostatic device including an indexing opening that is related to a particular heat cleaning setting of the device, and a spring-biased interlocking member supported within the control panel and being acted upon by the insertion of the key member into the slot to cause the movement of the interlocking member into the indexing opening, and switch means for activating the heating means into the high temperature heat cleaning range, and a sequence timer being started by the initiation of the Heat-Cleaning cycle, the timer including contact means for de-activating the heating means after a predetermined time.

References Cited by the Examiner

UNITED STATES PATENTS

| | | | |
|---|---|---|---|
| 2,962,575 | 11/1960 | Baker | 219—504 X |
| 3,094,605 | 6/1963 | Welch | 219—396 X |
| 3,214,567 | 10/1965 | Chisholm | 219—396 X |

RICHARD M. WOOD, *Primary Examiner.*

C. L. ALBRITTON, *Assistant Examiner.*

UNITED STATES PATENT OFFICE
CERTIFICATE OF CORRECTION

Patent No. 3,301,999　　　　　　　　　　　　January 31, 1967

Roy D. Chisholm

It is hereby certified that error appears in the above numbered patent requiring correction and that the said Letters Patent should read as corrected below.

Column 10, line 23, for "time, to initiate a cool-down period, and lock means coop-" read -- timer causes the lock means to engage the key member --.

Signed and sealed this 17th day of October 1967.

(SEAL)
Attest:

Edward M. Fletcher, Jr.　　　　　　　　　　EDWARD J. BRENNER
Attesting Officer　　　　　　　　　　　　　Commissioner of Patents